Sept. 10, 1929. G. W. DUNHAM 1,728,047
CLUTCH ARRANGEMENT FOR LAUNDRY MACHINES
Filed July 28, 1925 2 Sheets-Sheet 1

INVENTOR.
George W. Dunham
BY Albert M. Austin
ATTORNEY.

Sept. 10, 1929.  G. W. DUNHAM  1,728,047
CLUTCH ARRANGEMENT FOR LAUNDRY MACHINES
Filed July 28, 1925  2 Sheets-Sheet 2
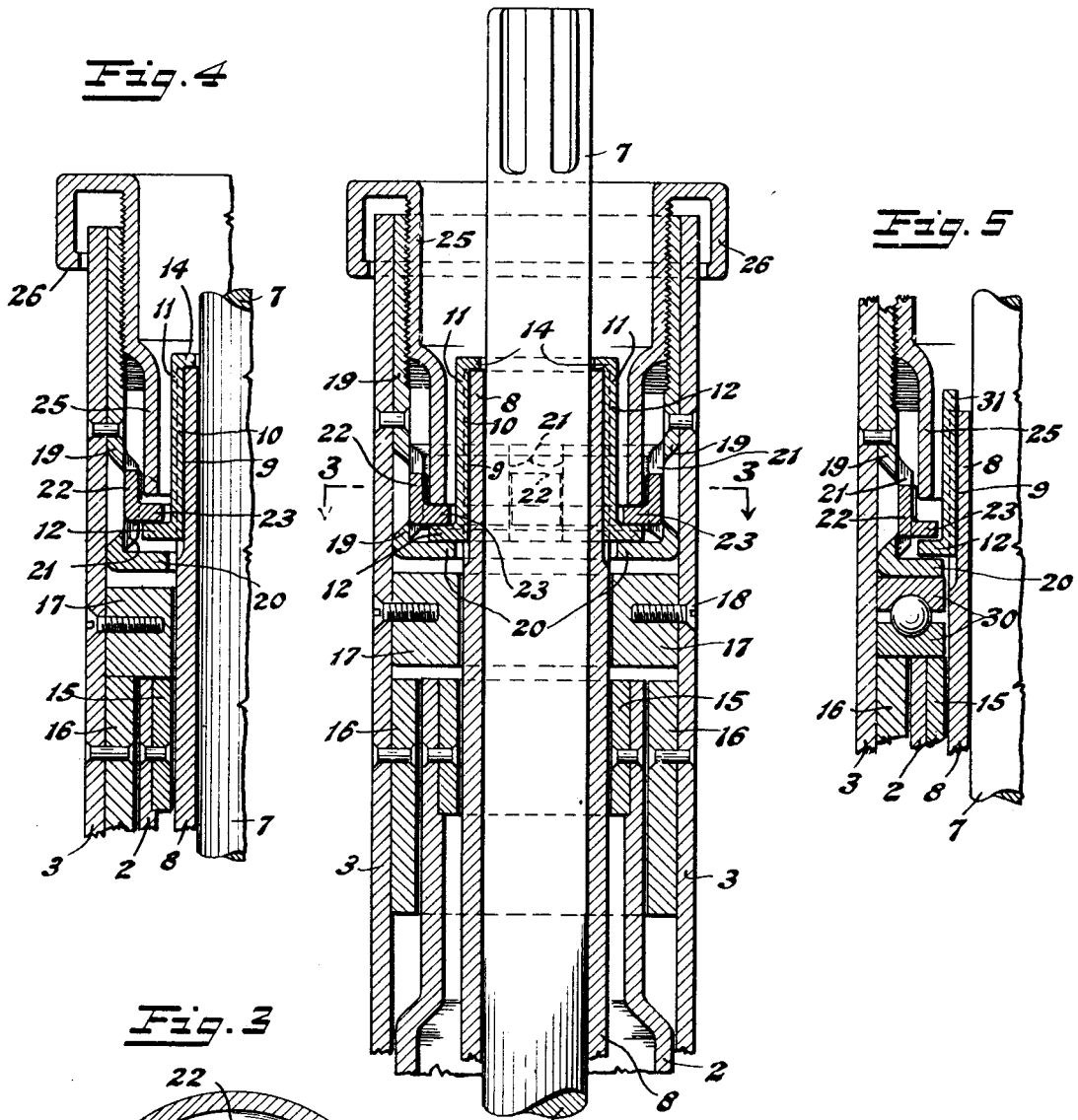
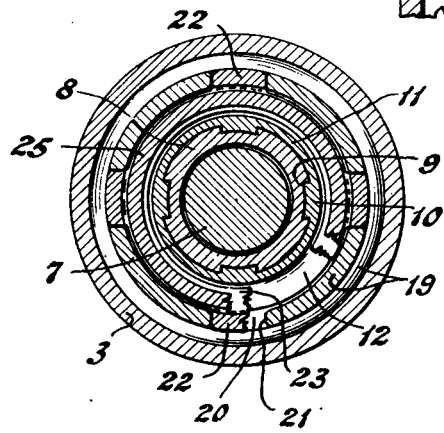
INVENTOR.
George W. Dunham
BY Albert M. Austin
ATTORNEY.

Patented Sept. 10, 1929.

1,728,047

UNITED STATES PATENT OFFICE.

GEORGE W. DUNHAM, OF UTICA, NEW YORK, ASSIGNOR TO WHIRLDRY CORPORATION, OF UTICA, NEW YORK, A CORPORATION OF NEW YORK.

CLUTCH ARRANGEMENT FOR LAUNDRY MACHINES.

Application filed July 28, 1925. Serial No. 46,550.

This invention relates to a laundry machine comprising a receptacle which may be stationary for washing and which rotates at a suitable speed for drying. The invention includes a clutch arrangement for operatively connecting and disconnecting the receptacle with the drive shaft and at the same time transferring the load from the pedestal which carries the load during washing to the drive shaft which carries the load during drying. The clutch arrangement may also be used simply for connecting and disconnecting the receptacle to the drive shaft without the load transferring means.

If the weight of the receptacle is taken by the top of the pedestal while the receptacle is driven at the relatively high speed necessary for drying, a good bearing should be provided between the receptacle and the top of the pedestal. Furthermore, the bearing must be kept well lubricated.

For this purpose it has been the custom to provide a ball bearing which was well filled with lubricant when the machine was assembled in the factory.

This arrangement gives splendid results but is subject to the disadvantage that ball bearings are expensive and that there is danger that after the machine has been in use for a long period of time the bearing will not be replenished with lubricant.

Therefore, it is of advantage to provide that the weight of the receptacle during the drying period be taken by a bearing which is cheaper than the ball bearing and which is always well lubricated. Such a bearing is present at the foot of the drying shaft in a gear box at the bottom of the machine.

Various other objects and advantages of the invention will be obvious from the following particular description of one form of mechanism embodying my invention or from an inspection of the accompanying drawings; and the invention also consists in certain new and novel features of construction and combinations of parts hereinafter set forth and claimed.

In the accompanying drawings I have shown for purposes of illustration one form of mechanism with certain modifications thereof embodying the invention, in which Fig. 1 is an elevation of a laundry machine provided with the invention with parts broken away showing the general construction;

Fig. 2 is a section of the receptacle hub showing the drive shaft and clutch mechanism, the receptacle being shown in operative connection with the drive shaft and the weight being carried thereby;

Fig. 3 is a section on the line 3—3 of Fig. 2;

Figure 1:
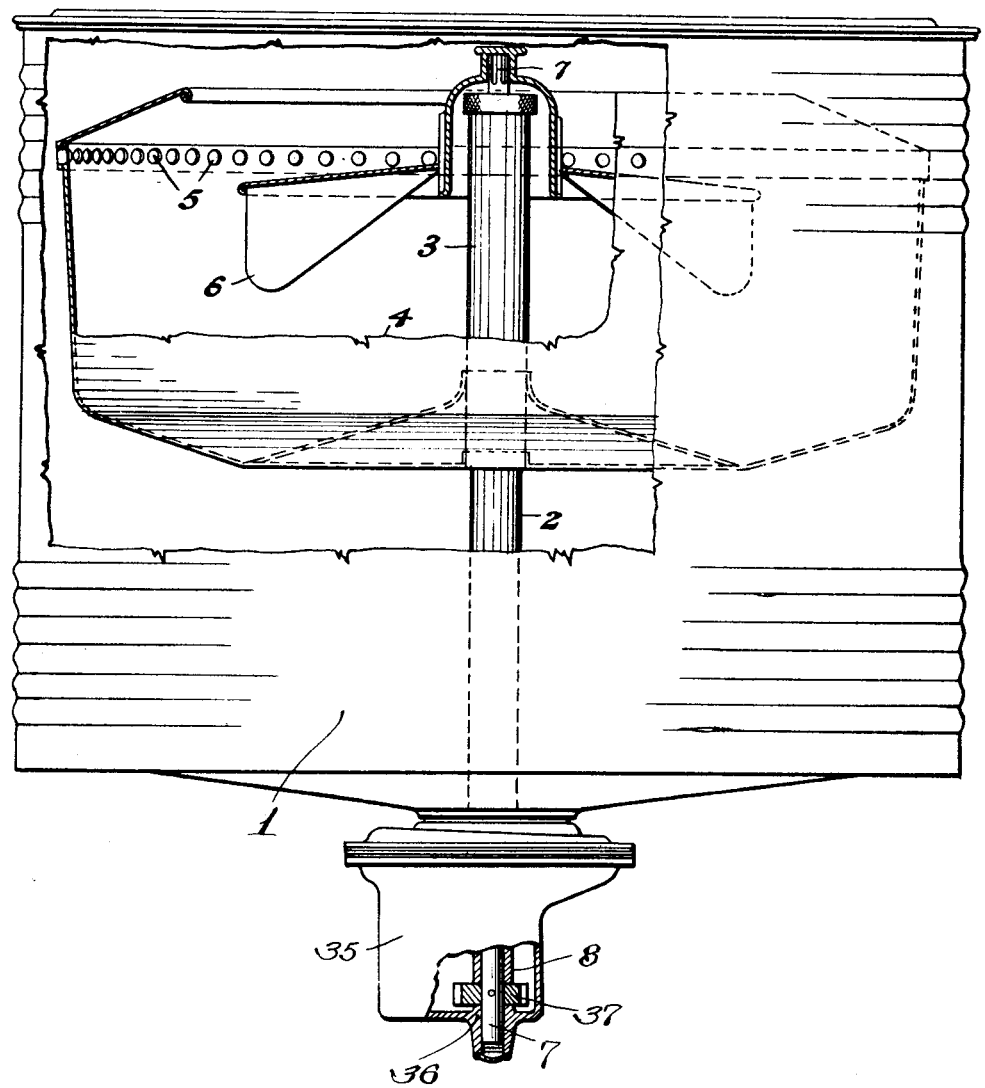

Fig. 4 is a fragmentary section of the arrangement shown in Fig. 2 but showing the clutch released and the weight of the receptacle being carried by the pedestal; and Fig. 5 is a section of the clutch construction showing a modification in which the clutch mechanism simply provides a clutch arrangement between the drive shaft and the receptacle, the weight of the receptacle being borne by the pedestal whether the receptacle is in operative connection with the drive shaft or not.

In the following description and in the claims parts will be identified by specific names for convenience of expression, but they are intended to be as generic in their application to similar parts as the art will permit.

Referring now to Figs. 1, 2, 3, and 4, the laundry machine may comprise a tank 1 supported in any suitable manner. Projecting preferably from the bottom of the tank 1 is the hollow pedestal 2 which extends up within the hub 3 of the receptacle 4. The receptacle may be of any desired construction. For purposes of illustration, however, an imperforate receptacle is shown having outlet openings 5 near its upper edge. Within the receptacle may be placed an agitator 6 which may have operative connection with a central washing shaft 7 which extends up through the hollow drying shaft 8. This agitator is preferably oscillated for washing by a suitable mechanism (not shown). It should be understood, however, that any kind of washing device may be used.

Extending through the hollow pedestal 2 is the drying shaft 8 which is tubular in form and which surrounds the washing shaft 7. Suspended from the tank bottom is a gear box 35 containing lubricant and having suitable gearing for operating the shafts 7 and 8. The end of drying shaft 8 bears against member 37 which in turn transmits the end thrust of the shaft 8 to bearing 36 carried by the gear box 35. The upper outside cylindrical surface of the drying shaft 8 has a series of longitudinal grooves 9 into which fit a series of splines 10 on a shaft clutch sleeve 11 which closely fits around the drying shaft 8. The shaft clutch sleeve 11 has an out-turned annular shaft clutch disk 12 at its lower end and an annular inturned shoulder 14 at its upper end which abuts the end of the drying shaft 8, thereby limiting the downward movement of the shaft clutch sleeve 11 on the drying shaft 8.

A bearing is provided at the upper end of the pedestal between the hub 3 of the receptacle and the pedestal 2 to take care of the radial stress caused by the turning of the receptacle. For this purpose a bearing sleeve 16 may be secured to the hub 3 by means of rivets.

A bearing is also provided at the upper end of the pedestal 2 between the pedestal and the drying shaft 8. For purposes of illustration this bearing may comprise a bearing sleeve 15 secured to the pedestal by means of rivets.

The hub 3 has an annular supporting ring 17 secured thereto in any desired manner as by means of screws 18. This ring bears against the top of the pedestal during washing to transfer the weight of the receptacle to the pedestal, as shown in Fig. 4.

The upper end of the hub 3 has secured within it a hub clutch sleeve 19 which may be secured to said hub in any desired manner as by means of rivets. The hub clutch sleeve 19 is threaded internally at its upper end and at its lower end has an annular inwardly projecting portion providing a hub clutch disk 20. Intermediate the ends is an inturned portion which is provided with longitudinal grooves 21 which cooperate with corresponding projections 22 on a clutch collar 23. Within the hub clutch sleeve 19 is screw threaded a clutch clamping sleeve 25 whose upper end is turned over to form a hand grasping portion 26 which surrounds the upper end of the hub. The lower end of the clutch clamping sleeve 25 is turned slightly inwardly so that it may engage the upper surface of the clutch collar 23. The outer surface of the hand grasping portion 26 may be suitably knurled for facility in turning the clutch clamping sleeve.

It will be easily seen that when it is desired to throw the receptacle 4 into operative engagement with the drying shaft 8 from the position shown in Fig. 4 to the position shown in Fig. 2, this operation may be accomplished by simply threading the clutch clamping sleeve 25 downwardly into the hub clutch sleeve 19. This operation not only causes the shaft clutch disk 12 to be securely clamped between the clutch collar 23 and the hub clutch disk 20, but also causes the weight of the receptacle 4 to be taken from the top of the pedestal 2 and transferred to drying shaft 8 through the shaft clutch sleeve 11 and its upper inturned shoulder 14.

In threading the clutch clamping sleeve 25 downwardly into the hub clutch sleeve 19, its first effect is to press the clutch collar 23 against the shaft clutch disk 12. Further downward threading of the clutch clamping sleeve 25 causes the hub 3 to be raised off the top of the pedestal 2. The hub 3 will continue to be raised until the hub clutch disk 20 abuts the shaft clutch disk, thereby clamping the shaft clutch disk 12 between the clutch collar 23 and the hub clutch disk 20.

Referring now to the modification shown in Fig. 5, the vertical weight of the receptacle is continuously carried by the pedestal through the intermediary of a ball bearing 30, the lower race resting upon the pedestal 2 and the upper race carrying the receptacle 4. The shaft clutch sleeve 31 is splined to the drying shaft 8 but is not limited in its downward movement relative thereto by an inturned shoulder as in Fig. 2.

The hub clutch sleeve 19 in this case rests directly upon the upper race of the ball bearing 30 thereby transmitting the vertical weight of the receptacle 4 to the pedestal 2.

In this construction when the clutch clamping sleeve 25 is threaded down into the hub clutch sleeve 19 the shaft clutch disk 12 will be clamped between the clutch collar 23 and the hub clutch disk 20 as before, but the weight of the receptacle 4 will not be transferred from the ball bearing 30.

This arrangement provides a simple and rugged construction of clutch mechanism for connecting and disconnecting the receptacle and the drive shaft. There are few parts and each may be made rugged, so that there is little chance of breakage. In addition to the connecting function of the clutch it may also perform the function of transferring the weight of the receptacle from the upper end of the pedestal to the drive shaft which in turn transfers it to a bearing which may be located at the bottom of the drive shaft in a position which is better adapted to take the weight than the top of the pedestal during the drying period when the receptacle may be rotating at high speed relative to the pedestal.

While I have shown and described and have pointed out in the annexed claims certain novel features of my invention, it will be understood that various omissions, substitutions and changes in the forms and details of the device illustrated and in its operation may be made by those skilled in the art without departing from the spirit of my invention.

I claim:

1. A laundry machine comprising a receptacle, a support for seating said receptacle, a drive shaft for said receptacle, and means for raising said receptacle relative to said shaft to transfer the weight of said receptacle from said support to said shaft.

2. A laundry machine comprising a receptacle, a support for said receptacle, a drive shaft for said receptacle, and means for simultaneously raising said receptacle relative to said shaft to transfer the weight of said receptacle from said support to said shaft and for operatively connecting said receptacle to said shaft.

3. A laundry machine comprising a receptacle having a hub, a hollow pedestal for supporting said receptacle and extending within said hub, a drive shaft within said pedestal, and means for raising said receptacle relative to said shaft to transfer the weight of said receptacle from said pedestal to said shaft.

4. A laundry machine comprising a receptacle having a hub, a hollow pedestal for supporting said receptacle and extending within said hub, a drive shaft within said pedestal, and means for simultaneously raising said receptacle relative to said shaft to transfer the weight of said receptacle from said pedestal to said shaft and for operatively connecting said receptacle to said shaft.

5. A laundry machine comprising a receptacle having a hub, a hollow pedestal for supporting said receptacle and extending within said hub, a drive shaft within said pedestal, a shaft clutch disk, means for causing said shaft clutch disk to rotate with said shaft, a pair of clamping members on opposite sides of said disk, and means for securing said members to said hub so that they may clamp said disk.

6. A laundry machine comprising a receptacle having a tubular member, a hollow pedestal for supporting said receptacle and extending within said tubular member, a drive member within said pedestal, a clutch disk, means for causing said clutch disk to rotate with one of the members, a pair of clamping parts on opposite sides of said disk, and means for securing said parts to said other member so that they may clamp said disk.

7. A laundry machine comprising a pedestal, a drive shaft within said pedestal, a receptacle hub resting on said pedestal, a shaft clutch sleeve surrounding said shaft and having a shaft clutch disk at its lower end, means for compelling said shaft clutch sleeve to rotate with said shaft, said receptacle hub surrounding said shaft, a hub clutch sleeve secured within said hub and having a hub clutch disk at its lower end, a clutch clamping sleeve, and means for adjustably securing said clutch clamping sleeve to said hub clutch sleeve, whereby, by adjusting said clamping sleeve said shaft clutch disk may be clamped between said hub clutch disk and said clamping sleeve to drive said receptacle hub.

8. A laundry machine comprising a pedestal, a drive shaft within said pedestal, a receptacle hub resting on said pedestal, a shaft clutch sleeve surrounding said shaft, means for compelling said shaft clutch sleeve to rotate with said shaft and for limiting its downward vertical movement relative to said shaft, said shaft clutch sleeve having a shaft clutch disk at its lower end, said receptacle hub surrounding said shaft, a hub clutch sleeve secured within said hub and having a hub clutch disk at its lower end, a clutch clamping sleeve, and means for adjustably securing said clutch clamping sleeve to said hub clutch sleeve, whereby, by adjusting said clamping sleeve, said receptacle hub may be lifted from said pedestal and said shaft clutch disk clamped between said hub clutch disk and said clamping sleeve to drive said receptacle hub.

9. A laundry machine comprising a pedestal, a drive shaft within said pedestal, a receptacle hub resting on said pedestal, said drive shaft being provided with longitudinal grooves at its upper end, a shaft clutch sleeve surrounding said shaft and having splines fitting said grooves, said shaft sleeve having a shaft clutch disk at its lower end, said receptacle hub surrounding said shaft, a hub clutch sleeve secured within said hub, said hub clutch sleeve having screw threads on its upper end, a hub clutch disk at its lower end, and longitudinal slots therebetween, a clutch collar having projections engaging said slots, and a clutch clamping sleeve having screw threads engaging said first screw threads and engaging said collar, whereby, by turning said clamping sleeve, said shaft clutch disk may be clamped between said hub clutch disk and said clutch collar to drive said receptacle hub.

10. A laundry machine comprising a pedestal, a drive shaft within said pedestal, a receptacle hub resting on said pedestal, said drive shaft being provided with longitudinal grooves at its upper end, a shaft clutch sleeve surrounding said shaft and having splines fitting said grooves, said shaft clutch sleeve having an inturned flange overlying the end of said shaft and a shaft clutch disk at its lower end, said receptacle hub surrounding said shaft, a hub clutch sleeve secured within said hub, said hub clutch sleeve having screw threads on its upper end, a hub clutch disk at its lower end, and longitudinal slots therebetween, a clutch collar having projections engaging said slots, and a clutch clamping sleeve having screw threads engaging said first screw threads and engaging said collar, whereby, by turning said clamping sleeve, said receptacle hub may be lifted from said pedestal and said shaft clutch disk clamped between said hub clutch disk and said clutch collar to drive said receptacle hub.

11. A laundry machine comprising a receptacle, a support for seating said receptacle, a gear case at the lower end of said support having an end thrust bearing, a drive shaft for said receptacle mounted on said thrust bearing, and means on said shaft for transferring weight of said receptacle from said support to said drive shaft, said gear case containing lubricant for effectively lubricating said thrust bearing.

12. A laundry machine comprising a receptacle, a pedestal for seating said receptacle, a drive shaft for driving said receptacle, and cooperating means wholly carried by and operating directly between said receptacle and shaft to cause relative movement between said receptacle and shaft for transferring the weight of said receptacle from said pedestal to said shaft.

13. A laundry machine comprising a receptacle having an upstanding hub, a pedestal disposed within said hub for seating said receptacle, a drive shaft for driving said receptacle, and cooperating means wholly carried by and operating directly between said hub and shaft to cause relative movement between said hub and shaft for transferring weight of said receptacle from said pedestal to said shaft.

In testimony whereof I have hereunto set my hand.

GEORGE W. DUNHAM.